United States Patent [19]
Zelikov

[11] Patent Number: 5,564,540
[45] Date of Patent: Oct. 15, 1996

[54] DIAPHRAGM CLUTCH ASSEMBLY WITH WEAR COMPENSATOR

[75] Inventor: Alexander Zelikov, Farmington, Mich.

[73] Assignee: Valeo Clutches and Transmissions Inc., Va.

[21] Appl. No.: 294,252

[22] Filed: Aug. 23, 1994

[51] Int. Cl.⁶ .................................................. F16D 13/75
[52] U.S. Cl. ................... 192/70.25; 192/89.24; 192/111 A
[58] Field of Search ................ 192/89.24, 111 A, 192/70.25

[56] References Cited

U.S. PATENT DOCUMENTS

| 4,099,604 | 7/1978 | Higgerson | 192/111 A |
| 4,924,991 | 5/1990 | Takeuchi | 192/111 A |
| 5,092,442 | 3/1992 | Takashi | 192/89.24 X |
| 5,186,298 | 2/1993 | Takeuchi | 192/111 A |
| 5,320,205 | 6/1994 | Kummer et al. | 192/70.25 |

FOREIGN PATENT DOCUMENTS

| 2606477 | 5/1988 | France | 192/111 A |
| 4-160232 | 6/1992 | Japan | 192/111 A |
| 2022729 | 12/1979 | United Kingdom . | |

*Primary Examiner*—Rodney H. Bonck
*Attorney, Agent, or Firm*—Morgan & Finnegan, L.L.P.

[57] ABSTRACT

In a wear-compensating arrangement for a pull-type clutch assembly, the fulcrums on the cover which engage against the diaphragm spring adjacent to its outer periphery are movable axially to the clutch assembly, being urged by springs towards the diaphragm spring. Each movable fulcrum is of arcuate form and is split circumferentially into an outer part which engages the diaphragm spring when the clutch is engaged and an inner part which engages it when the clutch is disengaged. Unidirectional jamming provided between the two parts and the cover permit movement of the parts towards the diaphragm spring but prevent return movement, so that on operation of the clutch the two parts of each fulcrum can move sequentially towards the diaphragm spring to compensate for any wear in the clutch linings.

5 Claims, 3 Drawing Sheets

DIAPHRAGM CLUTCH ASSEMBLY WITH WEAR COMPENSATOR

FIELD OF THE INVENTION

This invention relates to clutch assemblies of the kind which are operated by a diaphragm spring, and which are commonly used in motor vehicles. More particularly, the invention is concerned with mechanisms for automatically compensating for wear in pull-type clutch assemblies of this kind.

BACKGROUND OF THE INVENTION

Diaphragm spring clutch assemblies generally comprise a cover assembly which is mounted on the engine flywheel and which comprises a cover housing an axially moveable pressure plate connected in rotation with the cover by means of resilient straps, and a diaphragm spring which provides the load on the pressure plate;

a clutch disc which is splined on the input shaft of the gearbox, and which is clamped between the engine flywheel and the pressure plate; and a release bearing assembly which acts on the inner periphery of the diaphragm to cause the spring to pivot about its mounting in the cover and thereby release the load on the pressure plate.

The diaphragm spring itself generally comprises an outer peripheral part in the form of a Belleville washer ring which acts on the pressure plate, and an inner skirt which is divided into radial fingers. The spring is mounted for rocking movement between a ring of fulcrums carried by the cover, and the release bearing is adapted to act on the radially innermost ends of these fingers to cause the diaphragm spring to pivot between these fulcrums, thereby releasing the load and disengaging the clutch.

The outer peripheral part of the diaphragm spring usually acts on the pressure plate through an annular fulcrum formed on the pressure plate. In a push type clutch, in which the release bearing pushes the inner ends of the fingers of the diaphragm spring to disengage the clutch, the annular fulcrum on the pressure plate is radially outwards of the ring of fulcrums on the cover. In a pull-type clutch the fulcrums on the cover are radially outwards of the annular fulcrum on the pressure plate.

During the service life of the clutch, as the friction linings of the clutch disc wear, the engaged position of the pressure plate moves progressively closer towards the flywheel. Since the Belleville washer part of the diaphragm spring is always in contact with the annular fulcrum of the pressure plate, the ends of the fingers of the diaphragm spring move progressively, away from the pressure plate in a push-type clutch and towards it in a pull-type clutch. In either case, the load exerted by the diaphragm spring on the pressure plate begins to diminish, and if no action is taken, the clutch will eventually slip, leading to clutch failure.

Adjustment of the clutch to take into account the wear occuring during its service life normally requires that the release bearing should be moved progressively along the input shaft of the gearbox away from the ends of the fingers of the diaphragm spring as the clutch wears. However, this has the effect of increasing the pedal travel and may also increase the pedal effort required during declutching. This requires extra room to be provided in the clutch housing.

Various solutions to this problem have been proposed in order to achieve automatic adjustment of the clutch during its service life, and to provide for constant pedal load. One such arrangement is described in British published patent application GB 2022729A (Borg-Warner). In this proposal, the pressure plate fulcrum surface against which the diaphragm spring bears consists of a separate ring member which is connected to the pressure plate and which is continuously adjustable axially relative to the pressure plate by a series of camming surfaces which move the fulcrum surface outwardly as the clutch friction linings wear. The travel and load characteristics of the diaphragm spring thus remain constant during the service life of the clutch and no adjustment of the release bearing is necessary. However, this arrangement is rather complex in its construction.

In the arrangement described in U.S. Pat. No. 5090536 (Asada) the pressure plate fulcrum again consists of a separate ring member which in this case is screwed into the main body of the pressure plate. Rotation of the ring member in its thread in the pressure plate causes the fulcrum to move away from the friction surface. The ring member is rotated by means of a worm wheel which is operated by a lever and ratchet mechanism responsive to movement of the declutching mechanism. Again, this arrangement is complex both in its construction and operation.

It is an object of the present invention to provide a pull-type clutch assembly which incorporates an automatic wear compensating device.

It is a further object of the invention to provide a pull-type clutch assembly in which the displacement of the diaphragm Spring and its load characteristics remain substantially constant throughout the service life of the clutch.

It is a further object of the invention to provide a pull-type clutch assembly having an automatic wear compensating arrangement which is relatively simple in construction and operation.

SUMMARY OF THE INVENTION

In accordance with the present invention, a pull-type clutch assembly comprises an annular cover member, an axially moveable pressure plate connected in rotation with the cover member by resilient straps, and a diaphragm spring having an outer part in the form of a Belleville washer ring and an inner skirt divided into radial fingers for engagement with a release bearing assembly, the cover member carrying a plurality of fulcrums which engage against the diaphragm spring adjacent to its outer periphery and between which the diaphragm spring can pivot, and the pressure plate carrying an annular fulcrum engaging the diaphragm spring radially inwards of the fulcrums on the cover member, wherein the fulcrums carried by the cover member are each moveable relative to the cover member, in a direction axially of the clutch assembly, and are urged by springs towards the diaphragm spring, each moveable fulcrum being split into two parts capable of relative movement in relation to one another in the axial direction, namely a radially outer part which engages the diaphragm spring when the clutch is engaged and a radially inner part which engages the diaphragm spring when the clutch is disengaged, unidirectional jamming means being provided between the cover member and the parts of each moveable fulcrum to permit axial movement of said parts in a direction towards the diaphragm spring but to prevent axial movement in the opposite direction.

The invention thus provides an arrangment in which the fulcrums on the cover member are constantly urged by springs towards the diaphragm spring, and the splitting of these fulcrums into outer and inner parts which are alternately engaged and disengaged on operation of the clutch, together with the unidirectional jamming means, results in these fulcrums being gradually moved towards the diaphragm spring by alternate movements of their outer and inner parts, so as to take up the gap which would otherwise be caused by wear in the friction linings of the clutch disc. The one-way connections between the fulcrums and the cover member prevent return movement of the fulcrums.

The invention also comprehends a clutch cover assembly having the aforesaid features.

In order that the invention may be more fully understood, an embodiment in accordance therewith will now be described with reference to the accompanying drawings.

DETAILED DESCRIPTION OF A PREFERRED EMBODIMENT OF THE INVENTION

Figure 1:
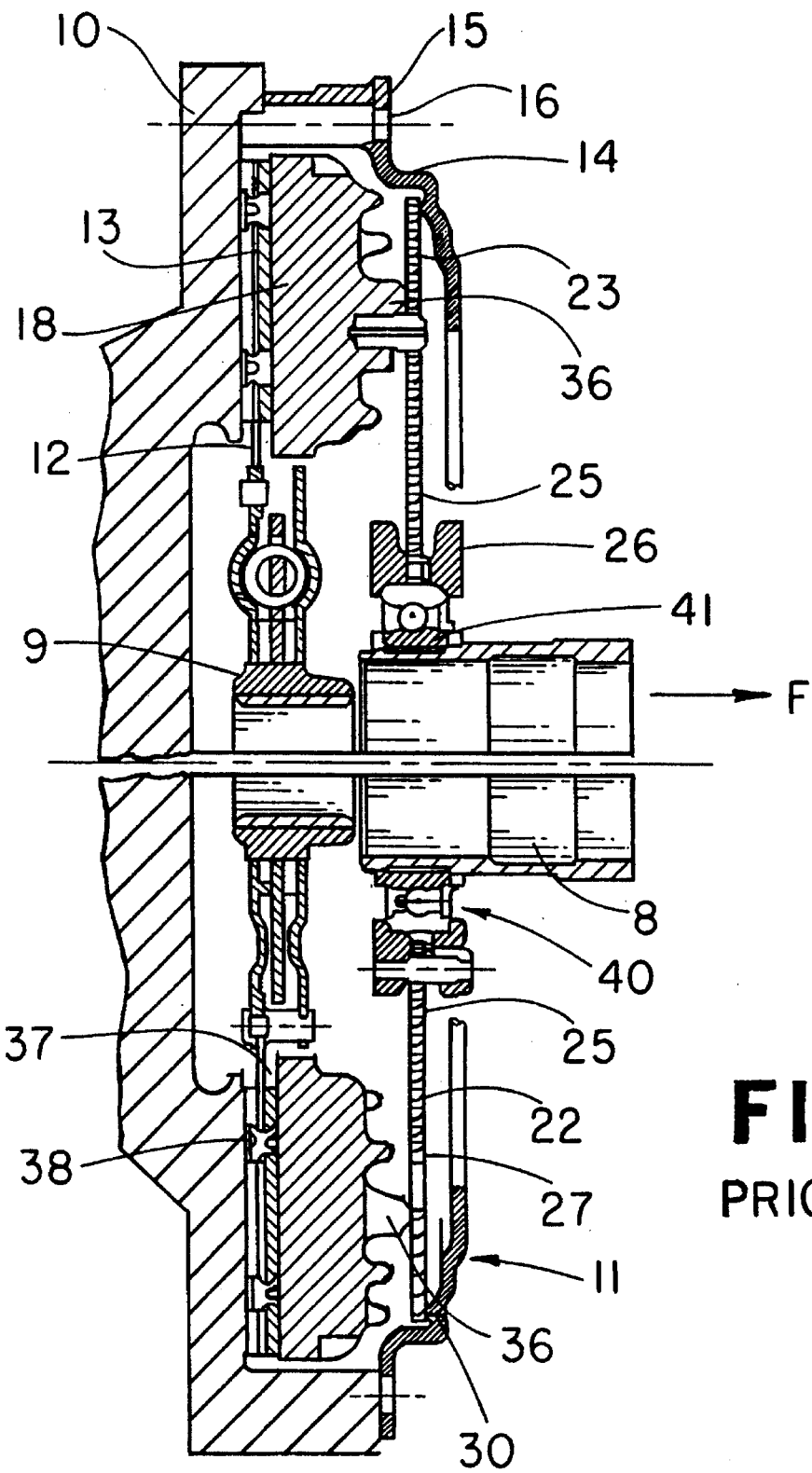
FIG. 1 is a cross-sectional view taken through a conventional diaphragm spring pull-type clutch of the kind suitable for use in a motor vehicle, and is illustrated to assist in the understanding of the invention.

Referring to the drawings, the apparatus will be described with the assistance of FIG. 1, which shows a conventional form of diaphragm spring pull-type clutch of the kind commonly used in motor vehicles. The clutch is mounted between gearbox input shaft 8 (represented in phantom lines) and engine flywheel 10 and essentially comprises a cover assembly generally indicated at 11, a clutch friction disc 12 having friction linings 13 and a splined central hub 9 engaging corresponding splines formed on the input shaft 8, and a release bearing assembly 40 comprising a ball bearing.

The cover assembly 11 shown in FIG. 1 comprises an annular pressed steel cover 14 having an annular flange 15 by which it is secured to the flywheel 10 by means of screws 16. The pressed steel cover 14 houses a pressure plate 18 which is rotatably connected to the cover in known manner by generally tangential torque transmitting resilient straps (not shown in FIG. 1 but seen in end view in FIGS. 3 to 5) each connected at one end by a rivet to a corresponding lug on pressure plate 18, and at the other end by a rivet to the cover 14. The straps tend to retract pressure plate 18 into cover 14 and provide for the release of the clutch disc 12 during declutching.

Cover 14 also supports a diaphragm spring 22 which is frustoconical in its free state and which has an outer elastic peripheral portion 23 of substantially annular form (a Belleville washer), and an inner skirt or central part divided into a series of resilient fingers 25 by radial slots formed in the diaphragm spring. The inner ends of the fingers 25 engage with clearance in a circular channel member 26 mounted on the outer race of clutch release bearing assembly 40.

The diaphragm spring 22 is retained in the cover against a primary fulcrum 30 comprising an annular bead formed on the inside surface of the cover 14 by a pressing operation.

In the engaged position of the clutch shown in FIG.1, the diaphragm spring 22 is deformed from its free state into a flat position in which the Belleville washer portion 23 applies load to a pressure plate fulcrum comprising a circular (or castellated) boss 36 provided on the adjacent face of the pressure plate 18. This clamps the friction linings 13 of clutch disc 12 between friction surface 37 of pressure plate 18 and friction surface 38 of engine flywheel 10, thus establishing a solid connection between engine flywheel 10 and gearbox input shaft 8 via the central hub 9 of clutch disc 12.

Declutching takes place when clutch release bearing 40 is pulled in the direction of arrow F to cause inner race 41 of the ball bearing to exert an axial thrust on resilient fingers 25 of diaphragm spring 22. This causes the outer elastic peripheral portion 23 of the diaphragm spring to pivot about its primary fulcrum 30, thus releasing the load on the fulcrum 36 on pressure plate 18. As this load is released, the tangential straps retract the pressure plate 18 and free the clutch disc, thereby breaking the connection between the engine flywheel 10 and the input shaft 8 of the gearbox.

Axial movement of clutch release bearing 40 along input shaft 8 is usually controlled by means of a clutch release fork which can be operated e.g. hydraulically or mechanically.

As will be apparent from FIG. 1, as the friction linings 13 of clutch disc 12 wear during the operational life of the clutch, the diaphragm spring 22 will tend to adopt a more inclined position in the clutch assembly with the fingers 25 moving closer to the engine flywheel 10. If this movement of the clutch release fingers 25 is sufficient to take up the clearance between these fingers and the channel member 26 carried by release bearing 40, fingers 25 will engage the channel member even in the clutch engaged position, and the full load of the diaphragm spring will not be applied to the pressure plate. Unless the position of the release bearing is adjusted to re-establish this clearance, the clutch will eventually slip. A substantial proportion of clutch failures are due to failure to maintain this adjustment during the operational life of the clutch. When the release bearing 40 is permanently in contact with the fingers 25, the release bearing travel is increased and wear is obvious.

FIGS. 2 to 5 show different views of a clutch assembly incorporating an automatic wear compensation mechanism according to the invention.

Figure 2:
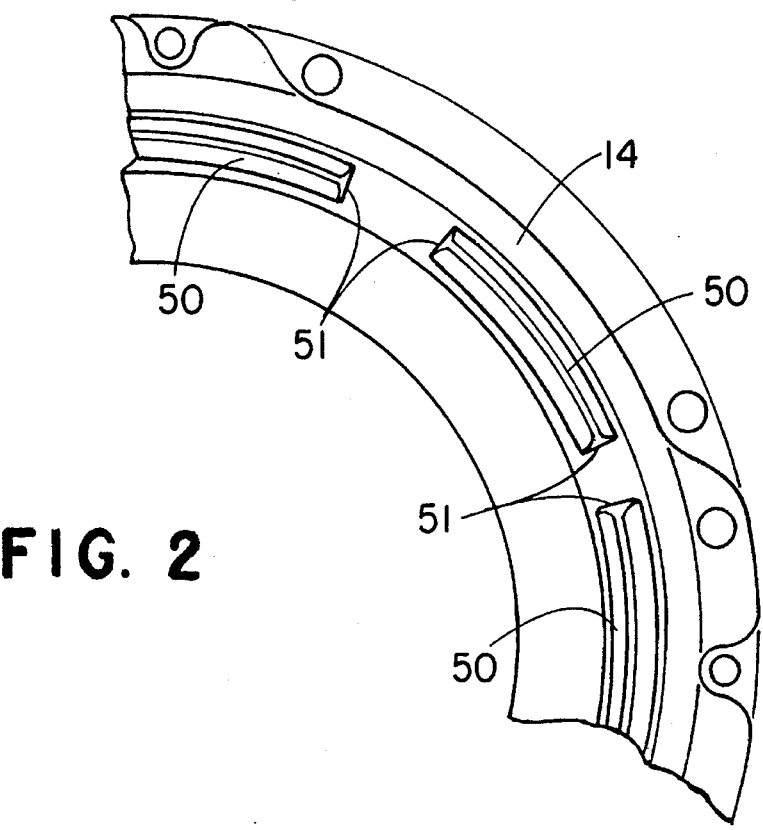
FIG. 2 is an elevation of part of a diaphragm spring clutch fitted with an automatic wear compensating mechanism according the invention.
Figure 3:
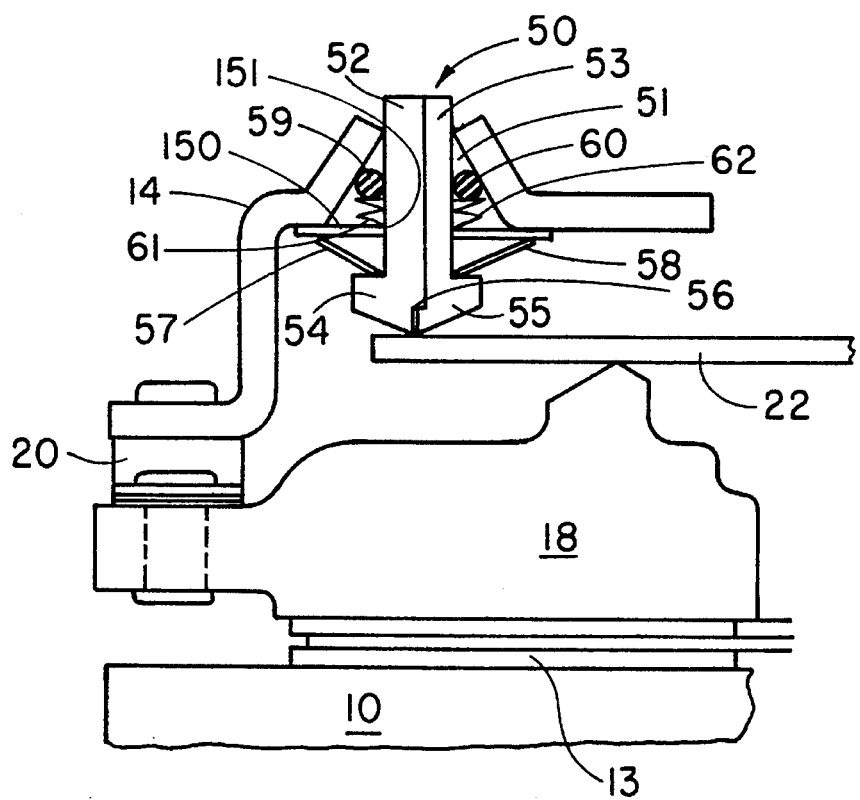
FIG. 3 is a part-sectional view of the clutch shown in FIG. 2 in the clutch engaged position before wear of the friction linings has taken place.
Figure 4:
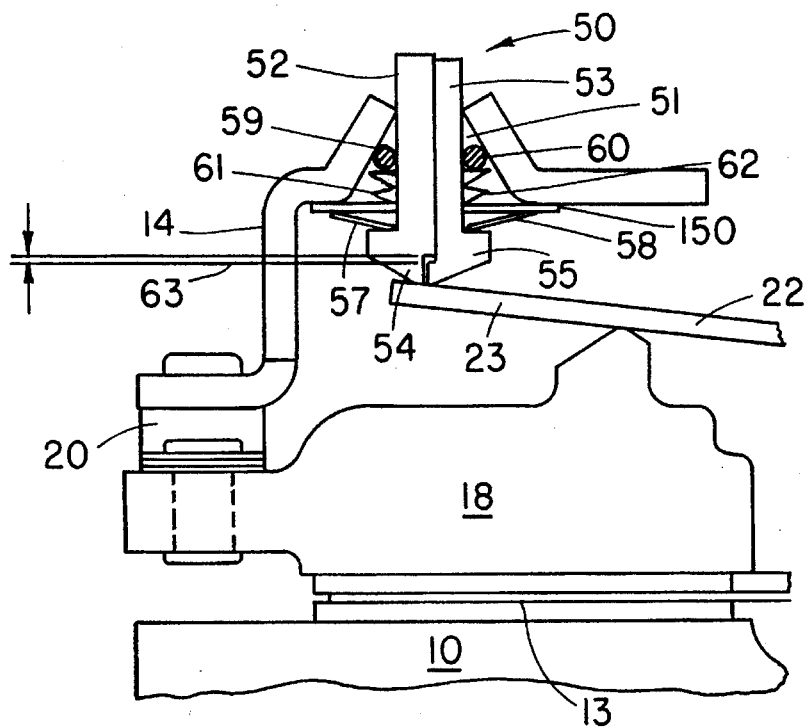
FIG. 4 is a part-sectional view of the same clutch shown in FIGS. 2 and 3 in the clutch engaged position after wear has occured to the friction linings but before compensatory movement of fulcrums.
Figure 5:
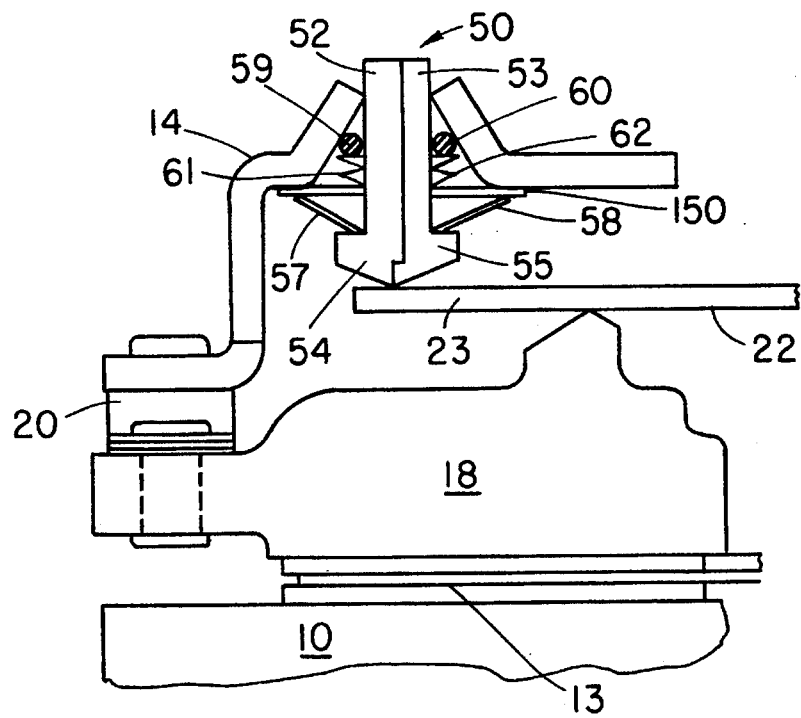
FIG. 5 is a similar view to FIG. 4, showing the position of the components after the fulcrums have moved to compensate for wear of the friction linings.

The clutch assembly of FIGS. 2 to 5 is generally similar to the conventional assembly shown in FIG. 1, but the primary fulcrum 30 carried by the cover 14 in FIG. 1 is here replaced by a plurality of movable fulcrums 50, of arcuate shape in elevation as shown in FIG. 2, centered on the axis of the clutch assembly and accommodated in arcuate tapered slots 51 in the cover 14 as more clearly shown in FIGS. 3 to 5. Each movable fulcrum 50 is split circumferentially into two parts capable of relative movement in relation to one another in the axial direction of the clutch, namely a radially outer part 52 and a radially inner part 53. Both parts 52, 53 have tapered abutment heads 54, 55, respectively, to engage the diaphragm spring 22, and complementary mating surfaces with a step 56 arranged to prevent the outer part 52 from projecting axially beyond the inner part 53. As a result of the deformation of the diaphragm spring 22 which occurs on operation of the clutch, the outer part 52 engages the diaphragm spring 22 when the clutch is engaged and the inner part 53 engages it when the clutch is disengaged.

The two parts 52, 53 of each fulcrum 50 are urged towards the diaphragm spring 22 by two independent springs 57, 58, in this case of Belleville type, extending all around the circumferences of the fulcrums 50. The springs 57, 58 bear on the reverse sides of the tapered abutment heads 54, 55 and on a common washer or ring 150 which is provided with holes or arcuate slots 51. The parts 52, 53 extend through the holes. Return movement of the parts 52, 53 is prevented by unidirectional jamming means comprising round-section split spring rings 59, 60 which are pre-loaded to contact the parts 52, 53 all around their respective circumferences. The rings 59, 60 are held in the wedge-shaped gaps between the parts 52, 53 and the sides of the tapered slot 51 by two independent springs 61, 62 interposed between the springs 59, 60 and the washer 150.

FIGS. 2 to 5 also show in end view the tangential straps 20 connecting the cover 14 and pressure plate 18.

In the clutch engaged position, when the friction linings 13 are unworn, the diaphragm spring 22 is substantially flat as shown in FIG. 3. Wear of the friction linings causes the pressure plate 18 to move closer to the flywheel 10 and if the fulcrums did not move the diaphragm spring 22 would tend to adopt a dished form as shown in FIG. 4.

The dished form of spring 22 allows the inner part 53 of the fulcrum 50 to move towards the diaphragm spring 22 under the pressure of spring 58 through the distance indicated at 63. When the clutch is next disengaged, the diaphragm spring 22 is flattened by the pull applied to its fingers and its outer portion 23 is engaged by and pivots about the head 55 of the inner part 53, allowing the outer part 52 to move in its turn towards the diaphragm spring 22 under the pressure of spring 57. On re-engagement of the clutch, the spring is again engaged by and pivots about the head 54 of the outer part 52. The unidirectional jamming means constituted by spring rings 59, 60 and springs 61, 62 ensure that the fulcrum parts 52, 53 cannot return into the slot 51.

The fulcrum 50 thus automatically moves towards the diaphragm spring 22 so as to compensate for wear in the friction linings 13 as it develops, and the assembly adopts the position shown in FIG. 5, in which the diaphragm spring 22 is maintained in its original flat form and the clearance between its fingers and the channel member carried by the release bearing is substantially unaffected.

I claim:

1. A pull-type clutch assembly comprising an annular cover member, an axially moveable pressure plate connected in rotation with the cover member by resilient straps, and a diaphragm spring having an outer part in the form of a Belleville washer ring and an inner skirt divided into radial fingers for engagement with a release bearing assembly, the cover member carrying a plurality of fulcrums which engage against the diaphragm spring adjacent to its outer periphery and between which the diaphragm spring can pivot, and the pressure plate carrying an annular fulcrum engaging the diaphragm spring radially inwards of the fulcrums on the cover member, wherein the fulcrums carried by the cover member are each moveable relative to the cover member, in a direction axially of the clutch assembly, and are urged by springs towards the diaphragm spring, each said moveable fulcrum being split into two parts capable of relative movement in relation to one another in the axial direction, said parts having a radially outer part which engages the diaphragm spring when the clutch is engaged and a radially inner part which engages the diaphragm spring when the clutch is disengaged, unidirectional jamming means being provided between the cover member and said parts of each moveable fulcrum to permit axial movement of said parts in a direction towards the diaphragm spring but to prevent axial movement in the opposite direction, said moveable fulcrums are of arcuate shape and are circumferentially spaced around a central axial of the clutch assembly and at equal distances from the axis, and wherein each said moveable fulcrum is accommodated in a receptive arcuate tapered slot in the cover member.

2. A pull-type clutch assembly according to claim 1, wherein each of the two parts of each moveable fulcrum has a respective tapered abutment head to engage the diaphragm spring.

3. A pull-type clutch assembly according to claim 1, wherein the two parts of each moveable fulcrum have complementary mating surfaces with a step arranged to prevent the outer part from projecting axially beyond the inner part.

4. A pull-type clutch assembly according to claim 1, wherein the unidirectional jamming means comprise jamming elements held in gaps between the parts of the moveable fulcrums and adjacent sides of the respective tapered slot in the cover member.

5. A pull-type clutch assembly according to claim 4, wherein the jamming elements are two round-section spring rings pre-loaded to contact the parts of the movable fulcrums all around their respective circumferences and held in the said gaps by respective independent springs.

\* \* \* \* \*